United States Patent [19]

Imai et al.

[11] Patent Number: 5,404,177
[45] Date of Patent: Apr. 4, 1995

[54] DOUBLE-PICTURE TYPE TELEVISION RECEIVER

[75] Inventors: Kiyoshi Imai, Osaka; Hisashi Arita, Hyogo; Ryuji Matsuura, Osaka; Taku Takada, Chigasaki, all of Japan

[73] Assignee: Matsushita Electric Industrial Co., Ltd., Osaka, Japan

[21] Appl. No.: 781,617

[22] Filed: Oct. 23, 1991

[30] Foreign Application Priority Data

Nov. 14, 1990 [JP]  Japan .................. 2-309384

[51] Int. Cl.$^6$ .................. H04N 9/74; H04N 5/262
[52] U.S. Cl. .................. 348/588; 348/584; 348/578
[58] Field of Search ............ 358/183, 22; H04N 5/45, H04N 5/262, 9/74; 348/588, 584, 578

[56] References Cited

U.S. PATENT DOCUMENTS

| | | | |
|---|---|---|---|
| 4,298,891 | 11/1981 | Baba et al. | 358/183 |
| 4,750,039 | 6/1988 | Willis | 358/183 |
| 5,130,800 | 7/1992 | Johnson | 358/183 |

FOREIGN PATENT DOCUMENTS

| | | | |
|---|---|---|---|
| 0224786 | 10/1986 | Japan | 358/183 |
| 0232771 | 9/1988 | Japan | H04N 5/46 |
| 103996 | 4/1989 | Japan . | |
| 0303996 | 12/1989 | Japan | 358/183 |
| 0075290 | 3/1990 | Japan . | |
| 4051684 | 2/1992 | Japan | H04N 5/46 |

Primary Examiner—Alvin E. Oberley
Assistant Examiner—Minsun Oh
Attorney, Agent, or Firm—Lowe, Price, LeBlanc & Becker

[57] ABSTRACT

A double-picture type television receiver for displaying two different pictures on its screen. The television receiver is equipped with an image memory having a capacity required for storing a child picture signal to be inputted, the child picture signal to be stored being for one picture and a line memory coupled in series to an output of the image memory. Also included are multipliers, one being directly coupled to the output of the image memory for multiplying the output of the image memory by a predetermined coefficient and the other being coupled to outputs of the line memory for multiplying the outputs of the line memory by a predetermined coefficient. An adder calculates the sum of outputs of the multipliers and outputs the sum signal as a child picture signal. A switching device is responsive to a parent picture signal inputted from an external circuit and further to the output of the adder for performing a switching operation between the parent picture signal and the output of the adder with respect to a display device.

7 Claims, 5 Drawing Sheets

A : CHILD PICTURE OF ASPECT RATIO 4 : 3

B : OBLONG IMAGE PORTION

C : CHILD PICTURE OF ASPECT RATIO 16 : 9

D : ENLARGED CHILD PICTURE OF ASPECT RATIO 16 : 9

DOUBLE-PICTURE TYPE TELEVISION RECEIVER

BACKGROUND OF THE INVENTION

The present invention relates to a double-picture type television receiver for displaying two different pictures on a screen.

Recently, in accordance with increase in the number of the oblong aspect-ratio image softwares, a technique to project such an image software on a child picture of a double-picture type television receiver is devised as exemplified by the Japanese Patent Provisional Publication No. 1-303996. A conventional double-picture type television receiver will be described hereinbelow with reference to FIGS. 1 and 2. FIG. 1 shows the state that an oblong child picture F whose aspect ratio is 16:9 is formed in a picture E of a television receiver whose aspect ratio is 4:3, and FIG. 2 illustrates a circuit arrangement of the double-picture type television receiver. In FIG. 2, designated at numeral 81 is an input terminal responsive to a high-grade television signal having an aspect ratio of 16:9, and denoted at numeral 82 is a scanning line conversion circuit coupled to the input terminal 81 for converting the high-grade television signal that the number of scanning lines is 1125 per frame into a NTSC signal that the number of scanning lines is 525 per frame and then outputting it as a parent screen signal. The high-grade television signal is also supplied from the input terminal 81 to a horizontal and vertical compression circuit 83 for compressing the input signal to generate a child picture signal. The output signal of the horizontal and vertical compression circuit 83 and the output signal of the scanning line conversion circuit 2 are respectively inputted to a picture combination circuit 84 for combining both the input signals, the combination signal being supplied to a display device 85 whose aspect ratio is 4:3.

In operation, concurrently with the conversion of the number of the scanning lines, the scanning line conversion circuit 82 removes both ends of the image signal with the aspect ratio of 16:9, inputted from the input terminal 81, to the aspect ratio of the display device 85 so that the aspect ratio becomes 4:3. This results in the fact that both the ends of the parent picture of the display device 85 disappear. In the horizontal and vertical compression circuit 83, the image signal (the high-grade television signal) inputted through the input terminal 81 is compressed up to the child picture size without removing both the ends of the picture. Thus, as illustrated in FIG. 1, the entire information of the oblong image signal can be projected on the child picture F.

As described above, the conventional double-picture type television receiver is arranged assuming that the image software, i.e., the high-grade television signal, inputted is oblong. However, in spite of the fact that it is often required that the image software produced for a movie (oblong picture) is inserted into the picture of the television receiver having the aspect ratio of 4:3 so that a portion of the information of the movie is not lost but the entire information thereof can be displayed thereon, there is a problem that the conventional television receiver is not arranged to cope with such a situation.

SUMMARY OF THE INVENTION

It is therefore an object of the present invention to provide a double-picture type television receiver which is capable of coping with an image software where an oblong picture is inserted into a picture with the aspect ratio of 4:3.

According to this invention, in a double-picture type television receiver for inserting as a child picture signal an image software, where an oblong picture is inserted into a picture with an aspect ratio of 4:3, into a parent picture to simultaneously display the parent picture and the child picture, there is included an image memory having a capacity required for storing a child picture signal to be inputted, the child picture signal to be stored being for one picture, and a line memory coupled in series to an output of the image memory. Also included are multipliers, one being directly coupled to the output of the image memory for multiplying the output of the image memory by a predetermined coefficient and the other being coupled to outputs of the line memory for multiplying the outputs of the line memory by a predetermined coefficient. An adder calculates the sum of outputs of the multipliers and outputs the sum signal as a child picture signal. A switching device is responsive to a parent picture signal inputted from an external circuit and further to the output of the adder for performing a switching operation between the parent picture signal and the output of the adder with respect to a display device.

The double-picture type television receiver according to this invention can select the following three child picture display modes by connectedly switching the multiplication coefficients of the output control section for controlling the reading from the image memory and the multiplier:

(1) the reading from the image memory is continuously effected with the coefficient of the multiplier connected to the output terminal of the image memory being fixed to 1 and the coefficient of the multiplier connected to the output terminal of the line memory being fixed to 0, whereby an image with an aspect ratio of 4:3 is directly displayed in the child picture. That is, the oblong picture is presented in the child picture with the aspect ratio of 4:3;

(2) although the reading from the image memory is basically effected continuously with the coefficient of the multiplier connected to the output terminal of the image memory being fixed to 1 and the coefficient of the multiplier connected to the output terminal of the line memory being fixed to 0, the reading is prohibited with respect to the image-absent portion, whereby the upper and lower portions of the child picture where the image is absent are eliminated so as to display the picture with the aspect ratio of 16:9; and (3) in the case that the aspect ratio of the oblong picture in the child picture is 16:9 (for example), the reading of the image memory is stopped one time (1 line) per four lines, i.e., at four-line interval, and the coefficients of the multipliers are switched at the four-line interval, whereby the height of the oblong picture is enlarged to be equal to the height of the child picture in the above-described mode (1) so as to display the child picture with the aspect ratio of 16:9.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
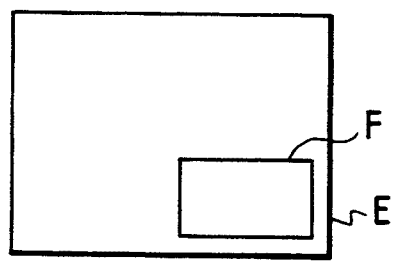
FIG. 1 shows a state that two pictures are displayed by a conventional double-picture type television receiver.
Figure 2:
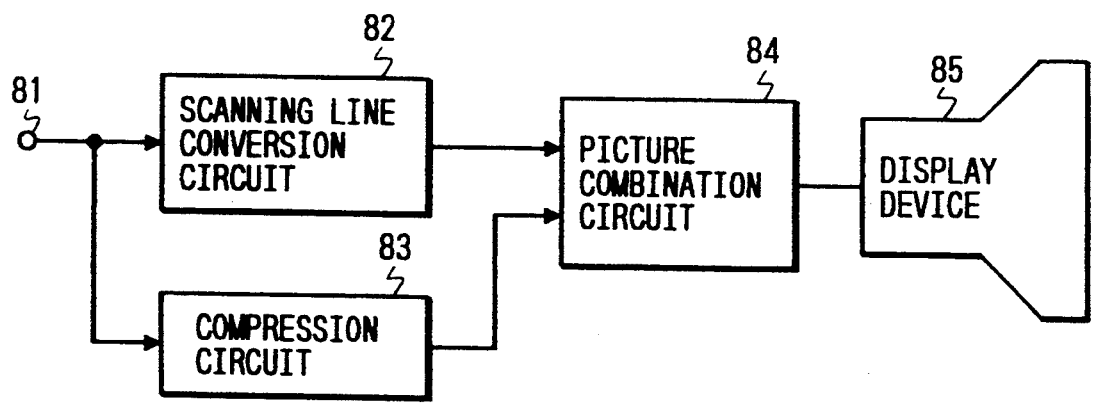
FIG. 2 is a block diagram showing an arrangement of a conventional double-picture type television receiver.
Figure 3:
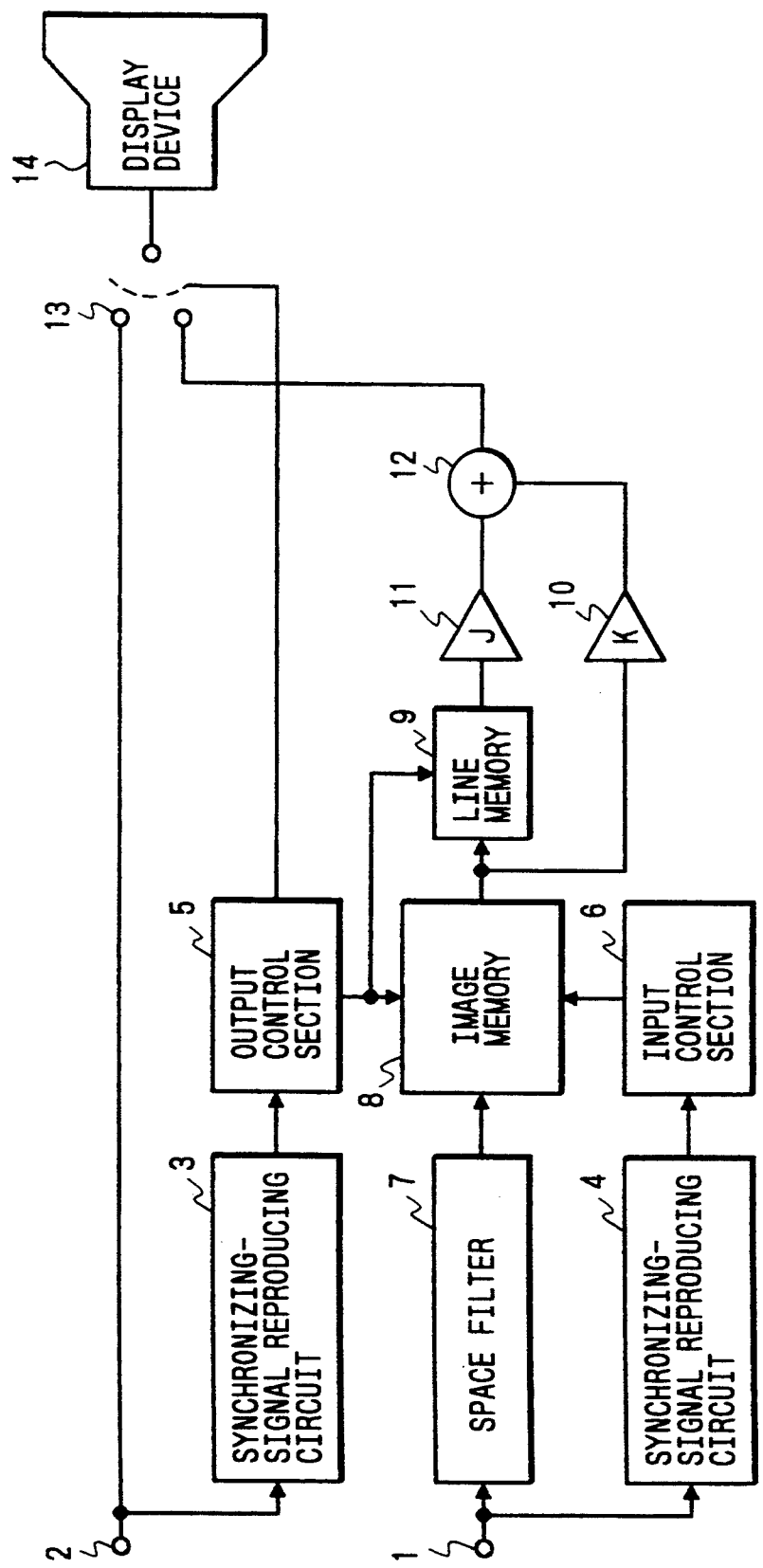
FIG. 3 is a block diagram showing an arrangement of a double-picture type television receiver according to an embodiment of the present invention.

Referring now to FIG. 3 there is illustrated an arrangement of a double-picture type television receiver according to an embodiment of the present invention. In FIG. 3, designated at numeral 1 is an input terminal which is coupled to an image software (a child picture signal) where an oblong picture is inserted into a picture whose aspect ratio is 4:3, and denoted at numeral 2 is an input terminal which is coupled to a parent picture signal (image signal). The parent picture signal is led from the input terminal 2 to a synchronizing-signal reproducing circuit 3 for reproducing horizontal and vertical synchronizing signals from the parent picture signal inputted. The output signal of the synchronizing-signal reproducing circuit 3 is supplied to an output control section 5 which in turn controls a memory on the basis of the output signal thereof. On the other hand, the child picture signal inputted to the input terminal 1 is supplied to another synchronizing-signal reproducing circuit 4 for reproducing horizontal and vertical synchronizing signals from the image signal supplied. The output signal of the synchronizing-signal reproducing circuit 4 is led to an input control section 6 for controlling a memory on the basis of the output signal thereof. The child picture signal inputted to the input terminal 1 is also led to a space filter 7 for limiting the horizontal and vertical bands thereof.

Illustrated at numeral 8 is an image memory having a capacity required for storing the image signal for one picture outputted from the space filter 7 after being thinned horizontally and vertically. The image memory 8 is coupled to a line memory 9 for storing one horizontal period of the image signal outputted from the image memory 8. The output of the image memory 8 is also supplied to a first multiplier 10 for multiplying the output of the image memory 8 by K ($K \leq 1$). The output of the line memory 9 is led to a second multiplier 11 for multiplying the output of the line memory 9 by J ($J \leq 1$, $J+K=1$). The outputs of the first and second multipliers 10 and 11 are added in an adder 12. Denoted at numeral 13 is a signal switching device coupled to the parent picture signal input terminal 2 and the output terminal of the adder 12 for performing a switching operation therebetween, i.e., for selecting the parent picture signal from the input terminal 2 for the parent picture display on a display device 14 and selecting the child picture signal from the adder 12 for the child picture display on the display device 14.

Figure 4:
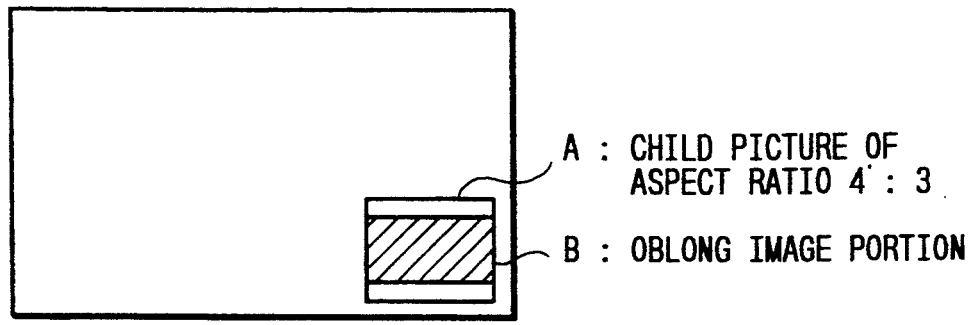
FIGS. 4 to 6 illustrate states that two pictures are displayed by the double-picture type television receiver according to this invention.
Figure 5:
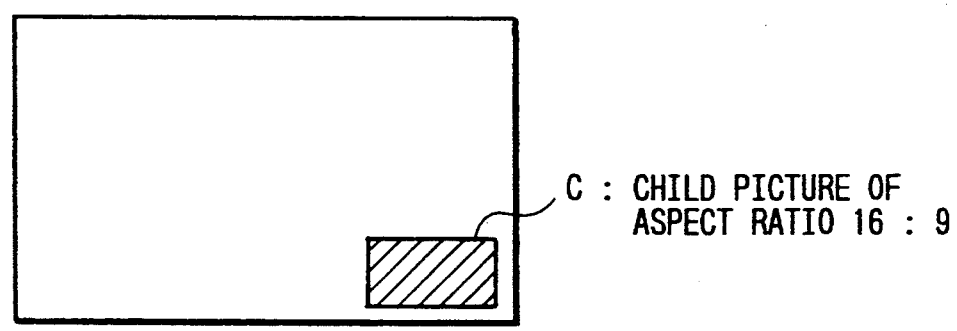
Figure 6:
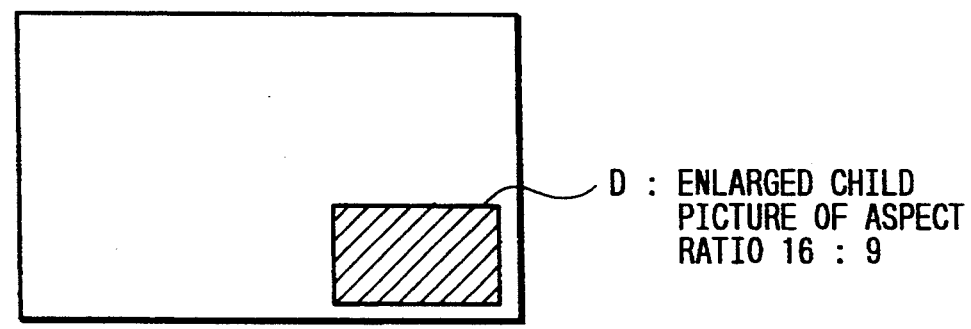

Here, FIG. 4 shows the state that an oblong picture B is displayed in a child picture A whose aspect ratio is 4:3 where the oblong picture B is indicated by oblique lines and the other portion of the child picture A is displayed with a single color such as a gray which is generally added in the image software production. FIG. 5 shows the state that only the oblong picture in FIG. 4 is displayed as the child picture C whereby the hidden portion of the parent picture can be reduced. FIG. 6 illustrates the state that the height of the child picture in FIG. 5 is increased to be equal to that of the child picture A in FIG. 4 so that the oblong picture is displayed as an enlarged child picture D.

Operation of the double-picture television transceiver thus arranged will be described hereinbelow in terms of each of the three child picture display modes illustrated in FIGS. 4 to 6.

FIRST CHILD PICTURE DISPLAY MODE

A method similar to a well known technique is taken in the case of display of the child picture with the aspect ratio of 4:3 as illustrated in FIG. 4. For writing the image signal in the image memory 8, the number of pixels and the number of scanning lines are thinned (decreased) in accordance with the compression ratio of the child picture. The space filter 7 is for reducing the returning (cyclical) distortion in thinning and is composed of a horizontal low-pass filter and a vertical low-pass filter. The writing to the image memory is controlled by the input control section 6 to the synchronism of the child picture signal. The reading from the image memory 8 is controlled by the output control section 5 to the synchronism of the parent picture signal. Here, the multiplication coefficient K of the multiplier 10 is set to "1" and the multiplication coefficient J of the multiplier 11 is set to "0", so that the output of the image memory 8 is supplied as the child picture signal to the signal switching device 13. The switching control of the signal switching device 13 is effected by the output control section 5 so that the display device 14 is coupled to the adder 12 side in the reading period from the image memory 8 and coupled to the parent picture signal input terminal 2 at the time period other than the reading period. According to the first child picture display mode, since the child picture with the aspect ratio of 4:3 is displayed as it is and an oblong picture is inserted in the child picture, the image corresponding to the image signal inputted can directly be displayed.

SECOND CHILD PICTURE DISPLAY MODE

The display of the child picture with the aspect ratio of 16:9 as illustrated in FIG. 5 is basically made in a manner similar to the above-described display of the child picture with the aspect ratio of 4:3. One difference therebetween is that the output control section 5 inhibits the reading from the image memory 8 with respect to the upper and lower portions of the child picture where the image is not displayed. According to the second child picture display mode, since the non-imaged portion of the child picture is removed so as to display the child picture with the aspect ratio of 16:9, it is possible to minimize the area of the parent picture which is reduced by the child picture.

THIRD CHILD PICTURE DISPLAY MODE

In the case of vertically enlarging the picture with the aspect ratio of 16:9 and displaying it as the child picture as illustrated in FIG. 6, the number of scanning lines is increased as compared with the above-described second child picture display mode. That is, let it be assumed that the aspect ratio of the oblong picture is 16:9. The aspect ratio of the child picture is 4:3, i.e., 16:12. Thus, for equalizing the height of the oblong picture to that of the child picture, the number of scanning lines is increased from 9 up to 12. In order words, the conversion rate is 4/3 times.

Figure 7:
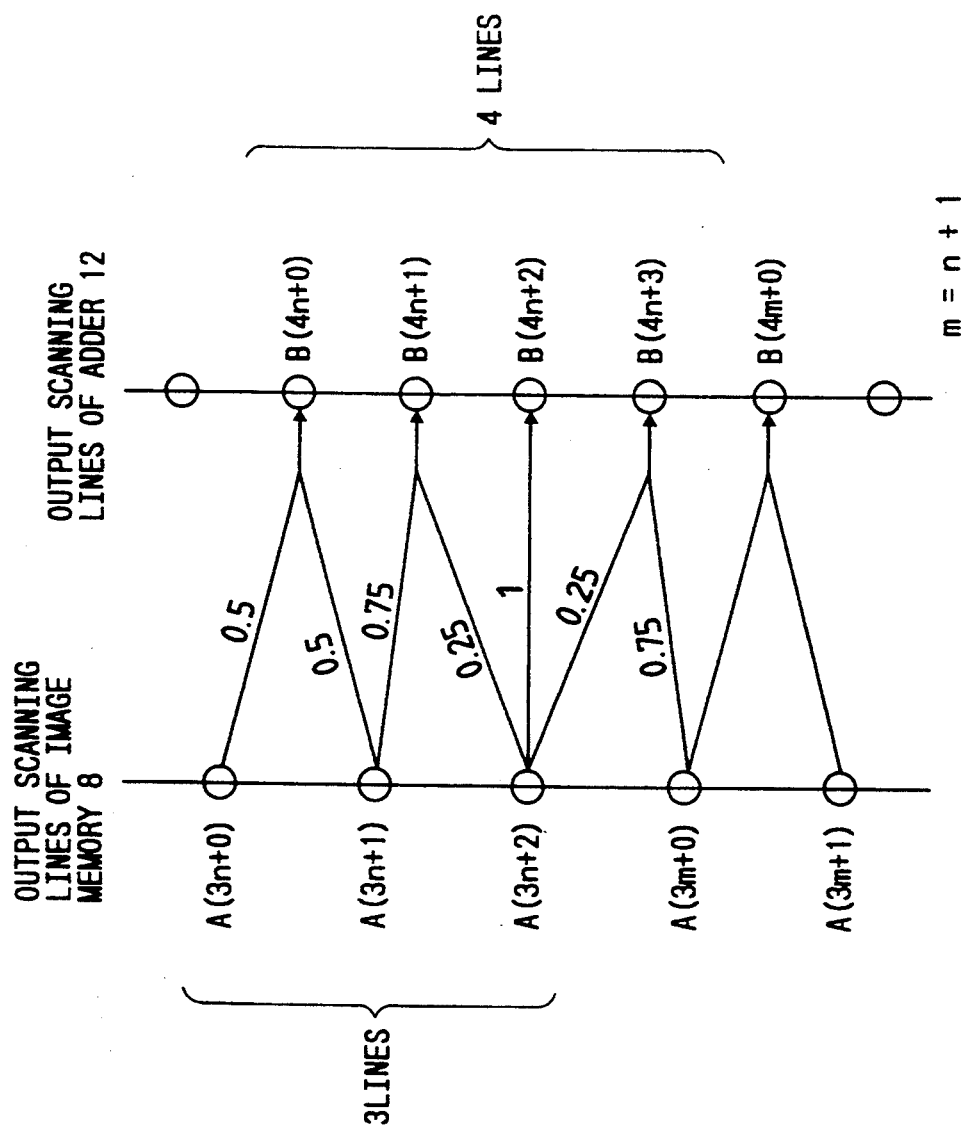
FIG. 7 is an illustration for describing a child-picture scanning-line conversion to be taken in the double-picture type television receiver according to this invention.

A technique for such a scanning line conversion will be described hereinbelow with reference to FIG. 7 which is an illustration of the scanning line conversion for the child picture. In FIG. 7, the circle marks vertically aligned at the left side of the illustration show the scanning lines in the image signal output of the image memory 8, the character A denotes the output scanning line of the image memory 8 and the numeral within the A ( ) represents the number of the scanning line counted from the upper side. Further, the circle marks vertically aligned at the right side of the illustration show the scanning lines to be outputted for the child picture after the scanning line conversion, the character B depicts the output scanning line of the adder 12 and the numeral within the B ( ) designates the number of the scanning line counted from the upper side. In the scanning line conversion, the four output scanning lines (B(4n+0) to B(4n+3)...) of the adder 12 are produced on the basis of the three output scanning lines (A(3n+0) to A(3n+2)) of the image memory 8. The following are the scanning line conversion equations in this embodiment.

$$B(4n+0) = 0.5 \times A(3n+0) + 0.5 \times A(3n+1)$$

$$B(4n+1) = 0.75 \times A(3n+1) + 0.25 \times A(3n+2)$$

$$B(4n+2) = 1.0 \times A(3n+2)$$

$$B(4n+3) = 0.25 \times A(3n+2) + 0.75 \times A(3m+0)$$

where m = n+1.

Thereafter, this calculation is repeatedly performed. For example, the determination of the coefficient of B(4n+1) with respect to A(3n+1) and A(3n+2) is made on the basis of the fact that the vertical distance relation, i.e., the spatial position relation (ratio) is as follows.

$$B(4n+1){:}A(3n+1) \quad 1$$

$$B(4n+1){:}A(3n+2) \quad 3$$

That is, for calculating B(4n+1) in accordance with the linear interpolation on the basis of A(3n+1) and A(3n+2), the coefficient of A(3n+1) is obtained by 3÷(1+3)=0.75 and the coefficient of A(3n+2) is calculated by 1÷(1+3)=0.25.

Thus, the deterioration of the vertical resolution can be suppressed with the above operation.

Figure 8:
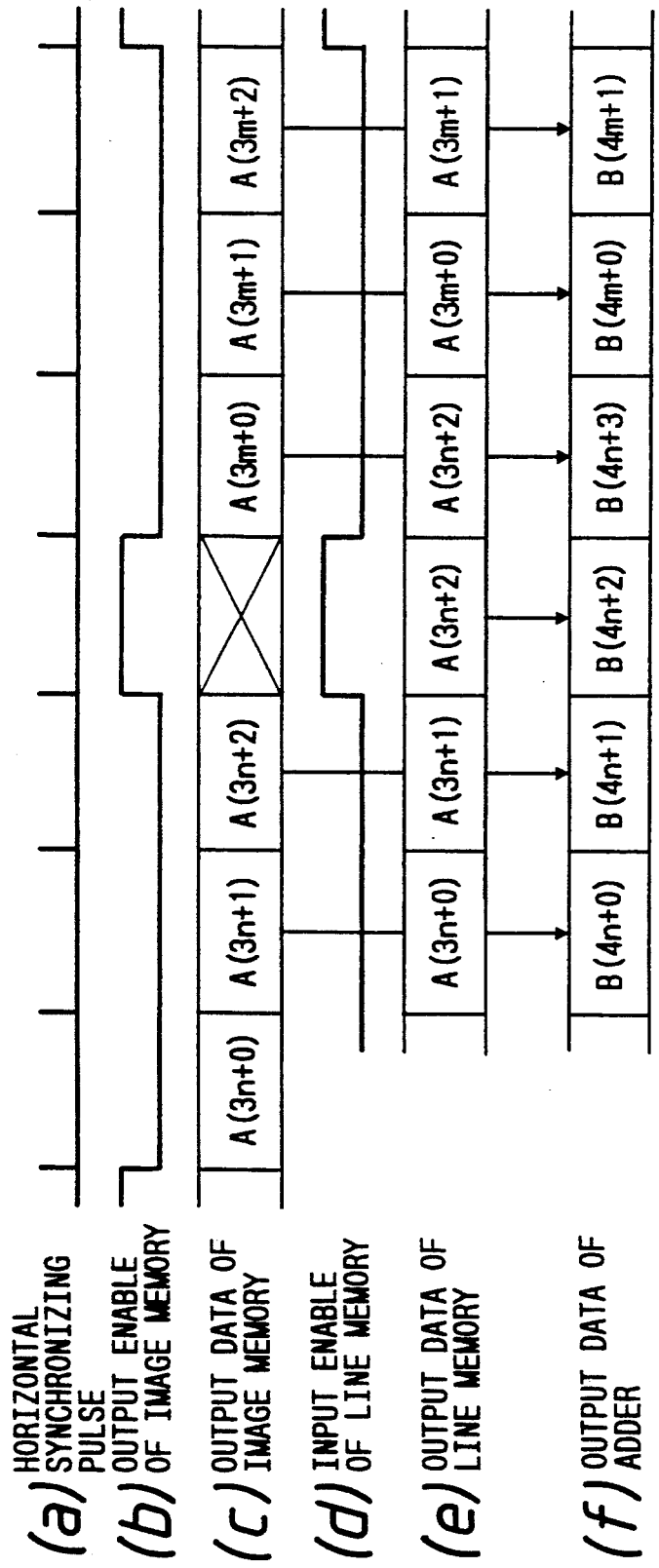
FIGS. 8(a–f) is an illustration of operation waveforms in the child-picture scanning-line conversion.

Although the above description has been made mainly in terms of the spatial arrangement of the scanning lines, for constituting the circuit in practice, a consideration is needed because the horizontal period in the output of the image memory 8 is equal to the horizontal period of the child picture displayed. This consideration will be described hereinbelow with reference to FIG. 8 showing the operation waveforms in the scanning line conversion. In FIGS. 8(a)-8(f), the references such as A(3n+0) respectively correspond to the references such as A(3n+0) used in FIG. 7. The waveform (a) is the output of the synchronizing-signal reproducing section 3 which is a horizontal synchronizing pulse signal of the parent picture signal. The waveform (b) is one of the output signals of the output control section 5 which is an output enable of the image memory 8. When the output level is 1, the reading from the image memory 8 is inhibited. The waveform (d) is one of the output signals of the output control section 5 which is an input enable of the line memory 9. When this output level is 1, the writing to the line memory is stopped. Further, the waveform (e) shows the output data of the line memory 9 and the waveform (f) indicates the output data of the adder 12.

A description will be made with reference to this waveform diagram in terms of the circuit operation for the scanning line conversion. The output enable waveform (b) of the image memory 8 is made such that the output level becomes 1 over one horizontal period of four horizontal periods. During the period corresponding to the output level being 1, the output data waveform (c) of the image memory 8 becomes indeterminate as illustrated by X in the illustration. The input enable waveform (d) of the line memory 9 is made such that the output level becomes 1 over one horizontal period of four horizontal periods as well as the waveform (b). During the period corresponding to the output level being 1, the writing of the line memory 9 is stopped. In the next horizontal period, the data similar to the data in the previous period are repeatedly outputted. In the illustration, A(3n+2); are repeated two times. In the portion other than this portion, the output data waveform (e) of the line memory 9 is made with the output data waveform (c) of the image memory 8 being delayed by one horizontal period.

The multiplication coefficient K of the multiplier 10 and the multiplication J of the multiplier 11 are respectively set at every scanning line calculated as follows in accordance with the scanning line conversion equation described with reference to FIG. 7.

| Scanning Line Calculated | Value of J | Value of K |
|---|---|---|
| B (4n + 0) | 0.5 | 0.5 |
| B (4n + 1) | 0.75 | 0.25 |
| B (4n + 2) | 1.0 | 0 |
| B (4n + 3) | 0.25 | 0.75 |

For example, since in the horizontal period of B(4n+0) in the output data waveform (f) of the adder 12 the waveform (c) is A(3n+1) and the waveform (e) is A(3n+0), if the the multiplication coefficients K and J of the multiplers 10 and 11 are set as shown in the above table, the calculation result obtained in accordance with the scanning line conversion equation can be obtained as the output of the adder 12. Thus, it is possible to obtain the child picture vertically enlarged to 4/3 times.

Here, in accordance with the vertical enlarging, a horizontal enlarging operation is required to be made with the same rate. This can be realized with, of the output of the output control section 5, the frequency of the reading clock supplied to the image memory 8 and the frequency of the clock to be supplied to the line memory 9 being respectively set to be lower than that of the picture displayed as illustrated in FIG. 5. When enlarging it to 4/3 times in the vertical direction, the clock frequency is multiplied by 3/4.

As described above, according to this embodiment, the child pictures due to three kinds of display modes can be realized at the output section of the image memory of a general double-picture television receiver with a simple structure, that is, with the line memory and others.

Here, this embodiment is applicable to the display device with any aspect ratio and is not affected by the presence or absence of the overlapping between the parent image picture area and the child picture area. Further, although in this embodiment the number of the line memory and the number of the multiplier are respectively arranged to be 1, it is appropriate to use two or more line memories or multipliers for the purpose of preventing the return in the vertical direction. In this case, the two or more line memories are directly coupled to the image memory and the outputs of the line memories are coupled to the corresponding multipliers, and the sum of the outputs of the corresponding multipliers and the output of the multiplier coupled to the output of the image memory 8 is calculated in an adder. More generally, such an embodiment may include N line memories coupled in series to the output of the image memory, and N+1 multipliers, one being directly coupled to the output of the image memory for multiplying the output of the image memory by a predetermined coefficient and the others being respectively coupled to outputs of the N line memories for multiplying the outputs of the N line memories by predetermined coefficients. An adder is provided for calculating and outputting the sum of outputs of the N+1 multipliers.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A double-picture type television receiver for displaying two different pictures on its screen, comprising:
   a first input terminal for inputting a parent picture signal;
   a second input terminal for inputting a child picture signal;
   an image memory having a capacity required for storing said child picture signal to be inputted through said second input terminal, said child picture signal to be stored being for one picture;
   a line memory coupled to an output of said image memory;
   two multipliers, one being directly coupled to the output of said image memory for multiplying the output of said image memory by a predetermined coefficient and the other being coupled to an output of said line memory for multiplying the output of said line memory by a predetermined coefficient;
   an adder for calculating and outputting the sum of outputs of said two multipliers; and
   switching means coupled to said first input terminal and an output terminal of said adder for performing a switching operation between said parent picture signal inputted through said first input terminal and the output of said adder, further comprising
   an output control section coupled to said image memory for selecting and effecting one of first to third modes for displaying said child picture signal, said first mode being for deriving said output of said image memory throughout all displaying periods of said child picture signal, said second mode being for deriving said output of said image memory only for a period of an oblong image portion of said child picture signal, and said third mode being for deriving said output of said image memory for three horizontal scanning periods of four horizontal scanning periods of said child picture signal.

2. In a multiple-image type television receiver for displaying different images including at least a parent image and a child image inserted in said parent image, the television receiver including an image memory for storing a child picture signal representing the child image and for providing the child picture signal for display within the parent image, the improvement comprising:
   image processing means for displaying said child image in one of three modes to enable improved display of a child image having a larger aspect ratio than the parent image, said image processing means including:
   first means for displaying said child image in a first mode wherein said output of said image memory is provided for display throughout all display periods of the child image corresponding to horizontal scan lines of the child picture signal and to added scan lines representing an image absent portion of the child picture image, thereby to insert in the parent image both the horizontal scan lines of the child picture signal and the added scan lines,
   second means for displaying said child image in a second mode wherein said output of said image memory is provided only for display periods of the child image corresponding to horizontal scan lines of the child picture signal and to exclude the added scan lines, thereby to insert in the parent image only horizontal scan lines of the child picture signal and to exclude the added scan lines, and
   third means for displaying said child image in a third mode wherein said output of said image memory for K horizontal scan lines of the child picture signal stored therein is provided during display of at least K+1 scan lines of said child image inserted in the parent image, where K is an integer greater than 0, thereby increasing a number of displayed scan lines of the child image.

3. A multiple-image type television receiver as recited in claim 2, wherein said third means includes means for providing 3 horizontal scan lines of the child picture signal from said image memory during display of at least 4 scan lines of said child image inserted in the parent image, thereby to enlarge a vertical dimension of the inserted child image by a ratio of at least 4:3.

4. A multiple-image type television receiver as recited in claim 2, wherein said third means comprises:
   first control means responsive to synchronizing signals of said child image for controlling writing the child picture signals in said image memory, second control means responsive to synchronizing signals of said parent image for controlling reading the child picture signals from said image memory, N line memories connected in series to an output of said image memory, where N is an integer greater than zero;

N+1 multipliers, one multiplier being directly connected to the output of said image memory for multiplying the output of said image memory by a predetermined coefficient and N other multipliers being respectively coupled to outputs of said N line memories for multiplying the outputs of said N line memories by predetermined coefficients;

an adder for calculating and outputting a sum of outputs of said N+1 multipliers; and switching means coupled to an input terminal receiving a parent picture signal and to an output terminal of said adder for performing a switching operation between said parent picture signal inputted through said first input terminal and the output of said adder.

5. A multiple-image type television receiver as recited in claim 4, wherein said third means includes means for providing 3 horizontal scan lines of the child picture signal from said image memory during display of at least 4 scan lines of said child image inserted in the parent image, thereby to enlarge a vertical dimension of the inserted child image by a ratio of at least 4:3.

6. A multiple-image type television receiver as recited in claim 5, wherein N is 1 so that said third means includes:

a single line memory connected in series to the output of said image memory and two multipliers, one multiplier being directly connected to the output of said image memory for multiplying the output of said image memory by a first predetermined coefficient and a second multiplier connected to an outputs of said single line memory for multiplying the output of said single line memory by a second predetermined coefficient;

wherein said adder is connected to said two multipliers for calculating and outputting a sum of outputs thereof.

7. A multiple-image type television receiver as recited in claim 6, wherein said first and second multipliers multiply the outputs of said image memory and said single line memory by predetermined coefficients having a sum value of 1.

* * * * *